United States Patent [19]

Topham et al.

[11] Patent Number: 5,044,604
[45] Date of Patent: Sep. 3, 1991

[54] VALVE PLUG HAVING FLUID DIRECTING GROOVES

[76] Inventors: Fred A. Topham, 17 Van Order Dr., Apt. 12-303, Kingston, Ontario, Canada, K7M 1B5; Joseph A. Toth, 9 Atlantic Ave., Unionville, Ontario, Canada, L3P 7B6; Michael F. Wilson, 40 Servington Crescent, Toronto, Ontario, Canada, M4S 2J4

[21] Appl. No.: 575,607

[22] Filed: Aug. 31, 1990

[51] Int. Cl.⁵ .......................... F16K 1/36; F16K 1/04
[52] U.S. Cl. .................................... 251/120; 251/121; 251/368
[58] Field of Search ............... 251/120, 319, 320, 368, 251/121

[56] References Cited

U.S. PATENT DOCUMENTS

| | | | |
|---|---|---|---|
| 732,776 | 7/1903 | Neumeyer | 251/120 X |
| 2,649,273 | 8/1953 | Honegger . | |
| 2,755,816 | 7/1956 | Collins . | |
| 3,327,992 | 6/1967 | Billeter et al. . | |
| 3,426,798 | 2/1969 | Chernak | 251/120 X |
| 3,857,542 | 12/1974 | Heymann . | |
| 4,055,095 | 12/1977 | Johnson . | |
| 4,535,808 | 8/1985 | Johanson et al. | 251/368 X |
| 4,753,687 | 8/1988 | Arth et al. . | |
| 4,781,213 | 11/1988 | Kilayko | 251/363 X |
| 4,830,281 | 5/1989 | Calder | 251/362 X |
| 4,886,498 | 6/1989 | Heron et al. . | |

Primary Examiner—Arnold Rosenthal
Attorney, Agent, or Firm—Ridout & Maybee

[57] ABSTRACT

A valve is provided preferably having a moulded plastic valve plug with a plurality of preferably arcuate grooves circumferentially spaced in the forward surface of the plug. The arcuate grooves distribute fluid flowing between the plug and valve seat substantially equally about the periphery of the valve plug. Fluid is also directed by the grooves to flow between a sealing surface of the plug and the valve seat in an outward radial direction substantially parallel to the valve seat. The resulting fluid flow reduces cavitation, valve stem chatter, noise and vibrations as well as reducing erosiion of the valve seat. An inner portion of the plug is made of a relatively high tensile strength material having a low thermal expansion rate whereas an outer portion of the plug including the plug sealing surface is made of a material having a relatively low surface hardness. The result is that the inner portion having the arcuate grooves remains relatively dimensionally stable whereas the outer portion resiliently seals upon the valve seat. A method of moulding the inner and outer portions of the plastic valve plug upon the valve stem is also provided.

14 Claims, 3 Drawing Sheets

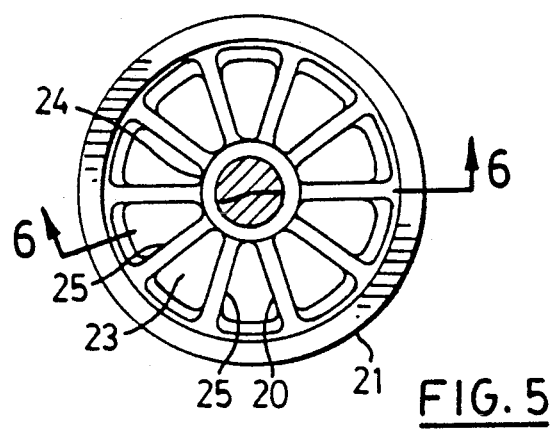
FIG. 5
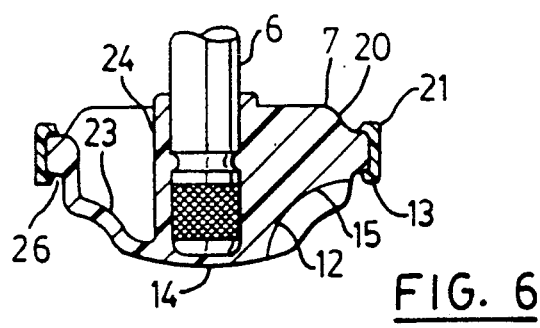
FIG. 6
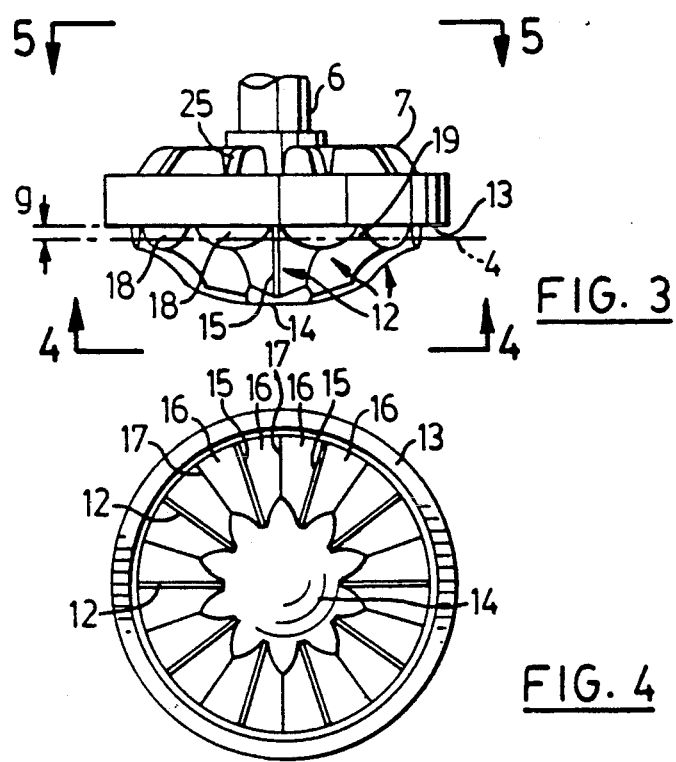
FIG. 3
FIG. 4

VALVE PLUG HAVING FLUID DIRECTING GROOVES

FIELD OF THE INVENTION

The invention is directed to a valve having a valve plug with grooves in the plug's forward surface to distribute and direct the flow of fluid between the sealing surface of the plug and the valve seat.

BACKGROUND OF THE INVENTION

Valves of numerous specific types are constructed of a hollow valve body having an inlet, an outlet and an internal annular valve seat. The valve seat coacts with the sealing surface of a valve plug to restrict fluid flow through the valve. A valve plug is mounted upon the forward end of a valve stem. The valve stem has a rearward portion being mounted in the valve body for reciprocal movement along a longitudinal axis perpendicular to and coaxial with the valve seat. Commonly the valve stem is in threaded engagement with the valve body and has a hand wheel or knob on its outer rearward end which projects through the valve body.

In operation, therefore, by turning the handwheel, the valve plug is moved forwardly toward the valve seat to restrict fluid flow and is moved rearwardly away from the valve seat to increase fluid flow through the valve. To fully seal the valve the resilient sealing surface of the valve plug is brought into sealing engagement with the valve seat.

It has long been recognized that high velocity extremely turbulent fluid flow results in the vicinity of the valve seat. Turbulent flow of high velocity is pronounced when the longitudinal gap between the valve seat and plug sealing face is relatively small, such as when the valve is initially opened or immediately before complete closing of the valve. Balancing valves used to balance flows within a fluid circuit are especially subject to turbulent flow since the gap between the seat and sealing face is often set relatively narrowly to restrict flow through the valve. Balancing valves therefore, may be subjected to extremely turbulent flows throughout their service lives. Uncontrolled turbulent flow in the vicinity of the valve seat is detrimental for a variety of reasons. Rapid erosion of the valve seat, valve body and plug may result from cavitation caused by the implosion of vapour bubbles resulting from the fluid flow. Upon the collapse of such bubbles, noise is emitted which may be objectionable. If the flow of fluid is not distributed about the periphery of the plug in a substantially equal manner, the flow of fluid may cause unbalanced forces upon the plug and stem which results in lateral mechanical vibrations or chatter. The vibrations cause wearing of the plug stem and stem packing as well as the threads interconnecting the stem and valve body.

In order to evenly distribute fluid flow about the periphery of the valve plug and to reduce the noise, vibrations and cavitation caused by fluid flow in the vicinity of the valve seat, conventional valves have been constructed having grooves, channels or baffles in the valve plug, or in the valve body adjacent the valve seat.

A conventional valve having randomly arranged and shaped serrations in the valve plug is described in the U.S. Pat. No. 3,857,542 to Heymann. The serrations are cut into a skirt of the plug to provide a multiplicity of differently shaped and oriented flow passages which result in random shock structures inhibiting noise and vibration. The consequent dissipation of the high velocity flow and reduction in turbulence reduces noise and mechanical vibration in such valves. Since the valve seat is generally perpendicular to the longitudinal axis of the valve stem and to the direction of fluid flow through the valve, the fluid is forced to change direction as it flows over the valve seat.

As well known to those skilled in the art of fluid dynamics, fluid flow over a sharp edge results in the formation of vapour plumes and unstable vortices. Such vapour plumes contain vapour bubbles caused by low pressure as the fluid flows over the sharp edge. As described above, vapour bubble formation is undesirable especially adjacent valve components since implosion of the vapour bubbles causes cavitation erosion. Unstable vortices are undesirable since vibration of the plug results. To lessen the tendency of vortex and plume formation therefore, the inner edge of the valve seat and outer mating surface of the plug in Heymann are rounded. Conventional valve seats are constructed as replaceable annular discs of uniform thickness countersunk within the adjacent valve body. Rounding of the inner edge of the seat adds to the manufacturing costs of seat and increases the contact area which engages the valve plug sealing face further aggravating the abrasion of the valve seat.

Other conventional valves having various arrangements of grooves to reduce noise and vibration are disclosed in U.S. Pat. No. 2,649,273 to Honegger, U.S. Pat. No. 4,065,095 to Johnson and U.S. Pat. No. 4,763,687 to Arth et al. All such conventional valves suffer from the disadvantage that the valve body or seat design must deviate significantly from the industry standard.

It is desirable therefore, to produce a valve having noise and vibration suppression capabilities which does not deviate from industry standard designs of valve seats and valve bodies in order to allow continued use of existing valve body castings and moulds. It is desirable to produce a valve with a valve seat which is of simple design and is quickly replaceable as in industry standard valves to reduce maintenance costs.

In addition, it is also desirable to enable retrofitting of noise and vibration suppression capabilities within existing valves lacking such capabilities. Retrofitting is most desirable since costs of replacement and removal are avoided.

SUMMARY OF THE INVENTION

A novel valve, a valve plug and a method of constructing a valve plug in accordance with the invention disclosed herein are provided which overcome the disadvantages of the conventional valves described above.

In accordance with one aspect of the invention there is provided a valve comprising a hollow valve body having an inlet, an outlet and an internal annular valve seat; a valve stem having a forward end and a rearward portion, the rearward portion being mounted in the valve body for reciprocal movement along a longitudinal axis perpendicular to and coaxial with the valve seat; and a valve plug connected to the forward end of the valve stem. The valve plug has a forward sealing surface positioned to coact with the valve seat to restrict fluid flow through the valve as the stem is moved forwardly. The valve plug has a plurality of arcuate grooves circumferentially spaced equidistantly from each other in the forward surface of the plug radially inward and forward of the sealing surface. The arcuate grooves at their outward ends are tangentially parallel to the sealing surface and the valve seat.

In this way, fluid flow is distributed substantially equally about the periphery of the valve plug and fluid is directed by the grooves to flow between the sealing surface and valve seat in an outward radial direction substantially parallel to the valve seat and sealing surface.

According to a further aspect of the invention is provided a valve plug connected to the forward end of a valve stem, the valve plug having a forward sealing surface position to coact with a valve seat to restrict fluid flow through a valve as the stem is moved forwardly. The valve plug has a plurality of arcuate grooves circumferentially spaced equidistantly from each other in the forward surface of the plug radially inward and forward of the sealing surface. The arcuate grooves at their outward ends are tangentially parallel to the sealing surface and the valve seat.

According to a further aspect of the invention is provided a method of manufacturing a moulded plastic valve plug upon a valve stem including the steps of: machining a valve stem including a knurled portion and a transverse groove in a forward portion of the stem; degreasing the valve stem; moulding an inner portion of the valve plug upon the forward portion of the stem; curing the inner portion; moulding an outer portion of the valve plug upon the inner portion; and curing the outer portion.

It will be appreciated that a valve plug in accordance with the invention may be retrofit within an existing industry standard valve by removing the existing valve stem and attached plug and installing in its place a novel valve stem and novel attached valve plug as described herein.

The fluid flow induced by the arcuate grooves reduces erosion of the valve seat and inhibits the formation of vapour plumes as fluid flows over the valve seat. Since the fluid is directed substantially parallel to the valve seat, an easily manufactured valve seat having a relatively sharp inner edge may be utilized without significant vapour plume formation.

BRIEF DESCRIPTION OF THE DRAWINGS

In order that the invention may be readily understood, the preferred embodiment of the invention will now be described by way of example with reference to accompanying drawings.

FIGS. 3 to 6 illustrate details of the valve plug wherein:

FIG. 3 is a lateral view of the exterior of the plug;

FIG. 4 is a view of the forward face of the valve plug in the direction of lines 4—4 of FIG. 3;

FIG. 5 is a view of the rearward end of the valve plug showing reinforcing ribs of the plug and showing the valve stem in section in the direction of lines 5—5 of FIG. 3; and FIG. 6 is a partial longitudinal sectional view along lines 6—6 of FIG. 5 showing the outer surface of the forward end of the valve stem as well as the cross-section of the valve plug.

DESCRIPTION OF THE PREFERRED EMBODIMENT

Figure 1:
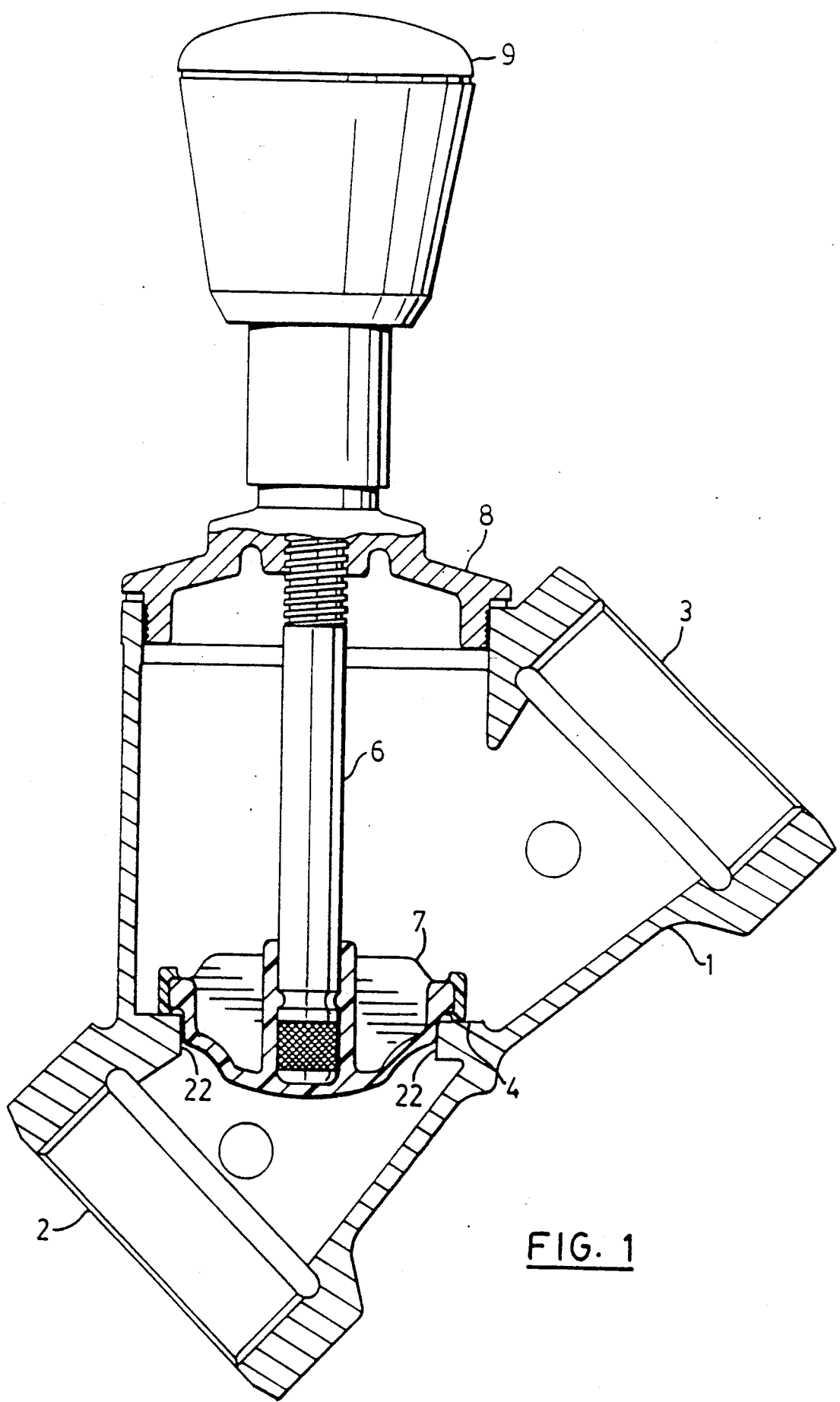
FIG. 1 is a partially broken away longitudinal sectional view through a valve body and valve plug in a fully closed condition in accordance with the invention.

Referring to FIG. 1, a valve in accordance with the invention has many components in common with conventional valves as described above with the significant exception of the novel valve plug and valve stem attached thereto.

The valve body 1 illustrated is in the globe valve configuration though it will be understood that any industry standard valve configuration with a longitudinally actuated valve plug may be used to equal advantage.

The valve body 1 has an inlet 2 and an outlet 3 which connect to conduits by threads as shown, flanges or other convention means. In the preferred embodiment, an internal annular valve seat 4 is formed within the hollow valve body 1. A valve stem 6 is mounted in the valve body 1 for reciprocal movement along the stem's longitudinal axis, perpendicular to and coaxial with the valve seat 4. On the forward end of the stem 6, a valve plug 7 is connected. In the particular embodiment shown, the rearward portion of the valve stem 6 is mounted in threaded engagement with a removable bonnet 8 of the valve body 1. By rotating the knob 9 secured to the rearward end of the stem 6, the valve plug 7 is moved forwardly and rearwardly along the longitudinal axis of the stem 6. The plug 7 has a forward sealing surface positioned to coact with the valve seat 4 to restrict fluid flow through the valve.

Figure 2:
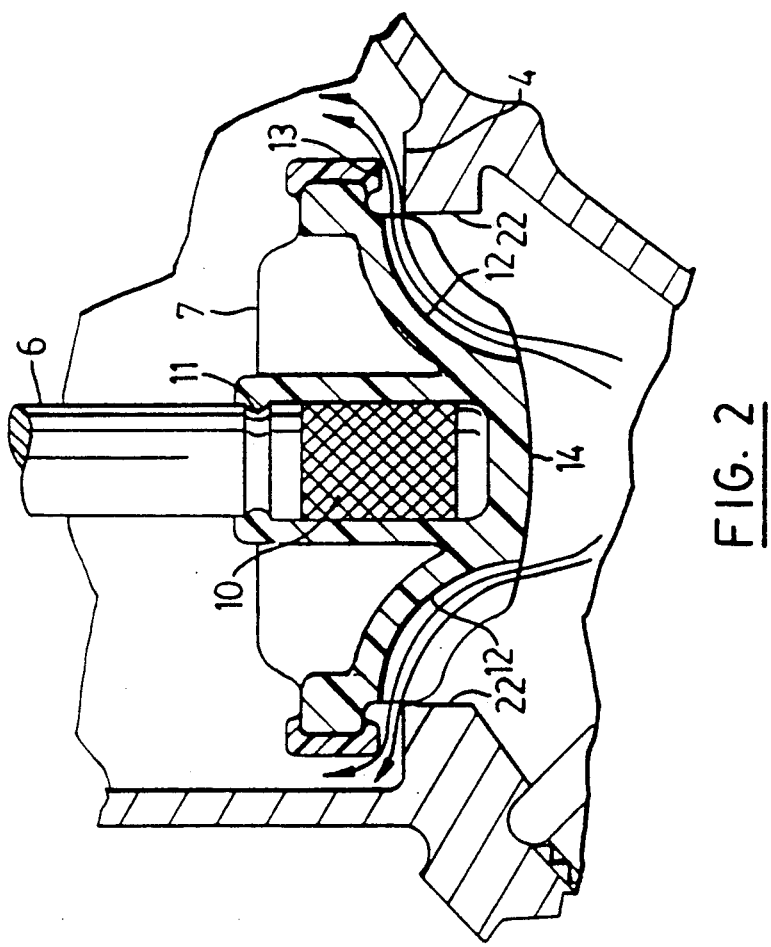
FIG. 2 is a detail of a view similar to FIG. 1 showing the valve plug spaced rearwardly from the valve seat in a partially open condition with arrows indicating the direction of fluid flow.

As shown in FIG. 2, the valve plug 7 is constructed of moulded plastic. The stem 6 has a knurled surface 10 and may also have a transverse groove 11 on the stem's forward portion upon which the plastic plug 7 is moulded. The transverse groove 11 engages the plug 7 to resist relative longitudinal motion while the knurled portion 10 primarily resists relative rotational motion, although the knurled portion 10 also resists relative longitudinal motion.

As illustrated in FIGS. 3 and 4, the valve plug 7 has a plurality of arcuate grooves 12 spaced equidistantly from each other in the forward surface of the plug 7. The arcuate grooves 12 are radially inward and forward of the sealing surface 13 of the plug 7. Referring to FIG. 6, the arcuate grooves 12 at their radially outward ends are tangentially parallel to the sealing surface 13 and the valve seat 4. The forward surface of the valve plug 7 preferably includes a convex central portion 14 radially inward of the sealing surface 13 and arcuate grooves 12.

The arrows shown in FIG. 2 illustrate the direction of fluid flow between the sealing face 13 and valve seat 4 through the valve in a partially or fully open condition. Fluid flowing from the inlet 2 impinges upon the forward face of the plug 7. The convex central portion 14 directs fluid radially outward toward the arcuate grooves 12. The fluid flow is distributed substantially equally about the periphery of the valve plug 7 since the plug 7 is located in the centre of the valve body 1 fluid channel and the forward face of the plug 7 is radially symmetric with equally spaced grooves 12. Fluid is directed by the grooves 12 to flow between the sealing surface 13 of the plug 7 and the valve seat 4 in an outwardly radial direction substantially parallel to the valve seat 4 and the sealing surface 13, as shown by the arrows in FIG. 2.

By directing the flow of fluid parallel to the seat 4, it is possible to use a valve seat insert 5 or valve seat 4 with a sharp inner edge without significant formation of vapour bubble plumes and consequent cavitation erosion of valve components. The parallel flow of fluid also decreases abrasive wearing of the sealing face 13 and valve seat 4 since fluid does not directly impinge upon these surfaces but is directed to flow over them in a parallel direction.

The substantially equal distribution of fluid about the periphery of the valve plug 7 results in generally balanced forces upon the plug 7 and stem 6 which reduces mechanical vibrations. Noise is also reduced since fluid velocity is equalized and vapour bubble production is substantially reduced by the direction of fluid flow through the arcuate grooves 12.

The particular configuration of the arcuate grooves 12 is best shown in FIG. 3, 4, and 6. Preferably, the grooves 12 in a radial longitudinal plane are concave having a substantially constant radius. Although, any geometry of groove 12 may be used which directs fluid flow from a longitudinal direction to a transverse direction parallel to the seat 4, a groove 12 of constant radius is preferred to simplify mould construction and machining. When the valve is to function as a circuit balancing valve, fine control over the restriction of flow is desirable especially when the gap between the seat 4 and sealing face 13 is relatively small. Slight increases in this gap may result in significant changes in the quantity of flow through the valve when the gap is relatively small such as when the valve is initially opened or immediately before full closure of the valve. Setting the gap at the precise dimension required for a particular desired effect upon the fluid circuit becomes a time consuming iterative process unless fine control over the restriction of fluid flow is provided.

To this end, therefore, the grooves 12 increase in width in the forward direction as illustrated in FIGS. 3 and 4. For ease of moulding and machining, the grooves 12 have a central landing 15 having a constant width and convex side walls 16 extending from the landing 15 forwardly and toward the adjacent grooves 12. The side walls 16 of adjacent grooves 12 intersect to form a radial ridge 17 between grooves 12. The radial ridges 17 merge radially inwardly with the central convex portion 14 of the plug 7. The radial ridges 17 part the flow of fluid radially outward of the central portion 14 and direct the flow toward the landing 15 of the arcuate grooves 12. The radially outward portion of the plug 7 forward of the sealing face is substantially cylindrical having a scalloped forward edge at its intersection with the arcuate grooves 12 as shown in FIG. 3. The result is the formation of individual scalloped abutments 18 between each adjacent groove 12. The gap between the sealing face 13 and the valve seat 4 is represented in FIG. 3 by the letter "g" and the rearward surface of the valve seat 4 is represented by the broken dashed line. As the valve is opened or closed, gap g increases or decreases respectively the size of the aperture 19 and thereby the quantity of fluid flowing into the gap g increases and decreases in relation to the dimension of the gap g.

The particular configuration of the landing 15 and the side walls 16 determines the relationship between the size of the aperture 19 and the gap g dimension. It will be apparent that varying degrees of fine control over fluid flow restriction may be obtained through variations in the number of grooves 12 and the particular configuration of grooves 12 chosen. The depth of grooves 12 (and thereby the longitudinal height of abutments 18) may also be varied to control fluid restriction such that many proportional relationships between gap g dimension and aperture 19 configuration may be accommodated. Each shape of groove 12 and resultant aperture 19 will have different flow characteristics due to surface friction effects. Therefore, by modification of the groove 12 geometry, fine control of the fluid restriction characteristics of the valve may be determined which is of particular advantage in association with circuit balancing valves.

As shown in FIGS. 1 and 2, the cylindrical outer surfaces of the abutments 18 are in longitudinal sliding engagement with a cylindrical inner surface 22 of the valve body 1 immediately adjacent the valve seat 4, when the valve plug 7 is closed or partially opened. When the valve is fully open, the plug 7 is rearwardly moved clear of the seat 4, such that the abutments 18 and cylindrical inner surface do not engage. When the valve is partially opened, the apertures 19 are relatively small and therefore, the velocity of fluid is relatively high. The valve in its partially open condition is more susceptible to mechanical vibration of the valve stem 6 and plug 7 than in its fully open condition due to the relative fluid velocities encountered. The abutments 18 therefore, aid in preventing mechanical vibration of the stem 6 and plug 7 by laterally engaging the cylindrical inner surface 22 of the valve body 1 during the most critical condition namely the partially open condition illustrated in FIG. 2.

Although a valve plug 7, as described above, may be constructed of any suitable material; such as cast or machined metal for example, in the preferred embodiment of the invention, the valve plug 7 is constructed of moulded plastic. Complex shapes are more easily accommodated through plastic moulding in comparison to machining or casting of metal, and adequate structural strength may be achieved through use of readily available plastics which may be reinforced with fibres. The sealing face 13 of the plug 7 must be resilient to seal against the seat 4, whereas the inner portion of the plug 7 must maintain its structural integrity in a severe environment. Although, a single material may serve both purposes in some applications, in the preferred embodiment, two plastics having different properties are used.

In the sectional view of FIG. 6, the valve plug 7 is shown comprising an inner portion 20 constructed of a first material including the central portion 14 and the grooves 12 and an outer portion 21 including the plug's sealing surface 13 constructed of a second material. The first material has a higher tensile strength and lower thermal expansion rate than the second material. The second material has a lower surface hardness than the first material. Through use of two materials of different properties, the characteristics of the inner and outer portions 20 and 21 can be optimally matched to their different functions. The inner portion 20 remains relatively dimensionally stable under thermal stress and stresses induced by the flow of fluid. In addition, the inner portion 20 remains securely attached to the stem 6 under the above stresses and under torsional stress induced by the friction between the sealing face 13 and valve seat 4. The outer portion 21 requires different properties due to its function. A low surface hardness is required to resiliently seal upon the valve seat 4. The outer portion 21 must also resist wearing under friction between the valve seat 4 and the sealing surface 13. A circular indentation 26 may be made in the area of connection between the inner and outer portions 20 and 21 to simplify moulding and to allow lateral expansion of the outer portion 21 as it seals against the valve seat 4.

In the preferred embodiment, the first material is a polyphenylene sulfide reinforced with 30 to 50 percent glass fibres by volume. The second material is a polypropylene resin reinforced with 10 to 30 percent glass fibres by volume. It has been found by experiment that the optimal proportion of glass fibres is 40 and 20 percent by volume in the first and second material respectively.

In order to reduce the weight and cost of the inner portion 20, the inner portion 20 may be constructed as a forward shell 23 of uniform thickness forming the grooves 12 and abutments 18, together with a sleeve 24 engaging the forward end of the stem 6 and a number of radial reinforcing ribs 25 connecting the shell 23 and sleeve 24.

The moulded plastic valve plug 7 is manufactured in the following manner. The valve stem 6 is machined including the knurled portion 10 and the transverse groove 11 in the forward portion of the stem 6. The valve stem 6 is carefully degreased to remove all residual traces of cutting oil since the hot plastic material moulded upon the stem 6 may become contaminated when residual oil burns on contact. The valve stem 6 is inserted into a close tolerance bushing in a first injection moulding tool. The inner portion 20 of the valve plug 7 is then moulded upon the forward portion of the stem 6. The inner portion 20 is then cured. The valve stem 6 with attached inner portion 20 is then inserted into a second injection moulding tool and the outer portion 21, of the second material, is moulded upon the inner portion. The outer portion 21 is then cured.

The embodiments of the invention in which an exclusive property or privilege is claimed are defined as follows:

1. A valve comprising:
   a hollow valve body having an inlet, an outlet and an internal annular valve seat,
   a valve stem having a forward end and a rearward portion, said rearward portion being mounted in said valve body for reciprocal movement along a longitudinal axis perpendicular to and coaxial with said valve seat, and
   a valve plug connected to the forward end of said valve stem, said valve plug having a forward sealing surface positioned to coact with said valve seat to restrict fluid flow through said valve as said stem is moved forwardly, said valve plug having a plurality of arcuate grooves circumferentially spaced equidistantly from each other in the forward surface of said plug radially inward and forward of said sealing surface, said arcuate grooves at their outward ends being tangentially parallel to said sealing surface and said valve seat, whereby fluid flow is distributed substantially equally about the periphery of said valve plug and whereby fluid is directed by said grooves to flow between said sealing surface and valve seat in an outward radial direction substantially parallel to said valve seat and sealing surface.

2. A valve according to claim 1 wherein the forward surface of said valve plug includes a convex central portion radially inward of said sealing surface and said arcuate grooves.

3. A valve according to claim 1 wherein said grooves in a radial longitudinal plane are concave having a substantially constant radius.

4. A valve according to claim 1 wherein each groove increases in width in the forward direction whereby the quantity of fluid flowing through said grooves between said valve seat and sealing surface increases and decreases in relation to the dimension of the gap between said seat and sealing surface as said valve plug is moved rearwardly and forwardly respectively.

5. A valve according to claim 1 wherein said valve plug is constructed of moulded plastic.

6. A valve according to claim 5 wherein said valve plug comprises:
   an inner portion constructed of a first material including said central portion and said grooves; and
   an outer portion, including said sealing surface, constructed of a second material.

7. A valve according to claim 6 wherein said first material has a higher tensile strength, and lower thermal expansion rate than said second material and wherein said second material has a lower surface hardness than said first material whereby said inner portion remains relatively dimensionally stable and whereby said outer portion resiliently seals upon said valve seat.

8. A valve according to claim 6 wherein said first material is a polyphenylene sulfide and said second material is a polypropylene resin.

9. A valve according to claim 6 wherein said first and second materials include glass fibre reinforcement.

10. A valve according to claim 9 wherein said first material includes 30 to 50 percent glass fibres by volume.

11. A valve according to claim 9 wherein said second material includes 10 to 30 percent glass fibres by volume.

12. A valve according to claim 5 wherein said forward portion of said stem has a knurled surface engaging said moulded plastic valve plug.

13. A valve according to claim 12 wherein said forward portion of said stem includes a transverse groove engaging said moulded plastic valve plug.

14. A valve plug connected to the forward end of a valve stem, said valve plug having a forward sealing surface position to coact with a valve seat to restrict fluid flow through a valve as said stem is moved forwardly, said valve plug having a plurality of arcuate grooves circumferentially spaced equidistantly from each other in the forward surface of said plug radially inward and forward of said sealing surface, said arcuate grooves at their outward ends being tangentially parallel to said sealing surface and said valve seat whereby fluid is distributed substantially equally about the periphery of said valve plug and whereby fluid is directed by said grooves to flow between said sealing surface and valve seat in an outward radial direction substantially parallel to said valve seat and sealing surface.

* * * * *